United States Patent [19]

Kujawski

[11] 4,421,298

[45] Dec. 20, 1983

[54] Y PATTERN VALVE

[76] Inventor: Edmund Kujawski, Coleridge Pl., Greenlawn, N.Y. 11740

[21] Appl. No.: 240,601

[22] Filed: Mar. 4, 1981

[51] Int. Cl.³ .............................................. F16K 31/44
[52] U.S. Cl. .................................. 251/368; 251/186; 251/333; 251/335 B
[58] Field of Search ........... 251/333, 359, 368, 335 B, 251/158, 176, 186; 137/242

[56] References Cited

U.S. PATENT DOCUMENTS

| 2,973,008 | 2/1961 | Klose | 251/368 |
| 3,211,419 | 10/1965 | Klinger-Lohr | 251/186 |
| 3,489,171 | 1/1970 | Michael, Jr. et al. | 251/368 |
| 3,913,887 | 10/1975 | Siepmonn | 251/359 |
| 4,009,865 | 3/1977 | Davlin | 251/366 |
| 4,073,314 | 2/1978 | Speelman et al. | 251/368 |
| 4,091,837 | 5/1978 | Edmunds et al. | 251/368 |
| 4,166,607 | 9/1979 | Webb | 251/335 B |
| 4,188,013 | 2/1980 | Battersby et al. | 251/333 |
| 4,212,317 | 7/1980 | Patrick et al. | 251/335 B |
| 4,237,920 | 12/1980 | Norman | 251/335 B |
| 4,270,727 | 6/1981 | Norman | 251/335 B |

Primary Examiner—A. Michael Chambers
Attorney, Agent, or Firm—Stephen E. Feldman; Marvin Feldman; Jules L. Chaboty

[57] ABSTRACT

A valve of the Y pattern is disclosed which is useful for stopping gas flow in a vacuum system. The valve has particularly good sealing characteristics needing moderate pressures to seal in a uranium hexafluoride environment. Heretofore an environment of uranium hexafluoride required high sealing pressures to be developed at the valve seat.

13 Claims, 3 Drawing Figures

Y PATTERN VALVE

BACKGROUND OF THE INVENTION

This invention relates to high vacuum valves used to seal corrosive materials.

Heretofore it has been difficult to provide a good valve seal unless the valve seat is subject to large forces required by the sealing pressures. These large forces result in cumbersome devices to close and open the valves.

Efforts to solve this problem have been made and are known in the art.

A search of U.S. Patent Office Records show certain prior art patents which disclose representative examples of known efforts to solve some of the problems associated with the art embodying this invention.

U.S. Pat No. 3,282,276 to Mark discloses a valve design wherein a different portion of the valve seat is to be engaged by the valve member during each closure of the valve.

The U.S. Pat. No. 4,050,423 to Cho discloses a valve head which provides a valve cleaning function whereby the valve seat is cleaned of particles thereby providing a better seal with the valve.

W. G. Oniek Jr. in his U.S. Pat. No. 3,474,820 provides for a Y pattern valve which depends on extensive contact between the valve and valve seat for sealing purposes.

While I do not wish to minimize the inventiveness and efforts associated with the aforesaid prior patents, and which these people may be attempting to solve a problem that is similar to some of the problems solved by the present invention, they are not as effective as the present invention.

SUMMARY OF THE INVENTION

Accordingly it is an object of the present invention to provide a valve which will operate in a vacuum system;

Another object of the invention is to provide a valve which will function in a uranium hexafluoride environment;

Yet another object of this invention is to provide a valve which provides a valve seal with significantly less closing force;

A further object of this invention is to provide a seat design which minimizes the accumulation of uranium hexafluoride powder in the seat area.

BRIEF DESCRIPTION OF THE DRAWINGS

My inventin will be made more clearly understood from the following description of specific embodiments of the invention together with the accompanying drawings in which.

DETAILED DESCRIPTION OF THE PREFERRED EMBODIMENT

Figure 1:
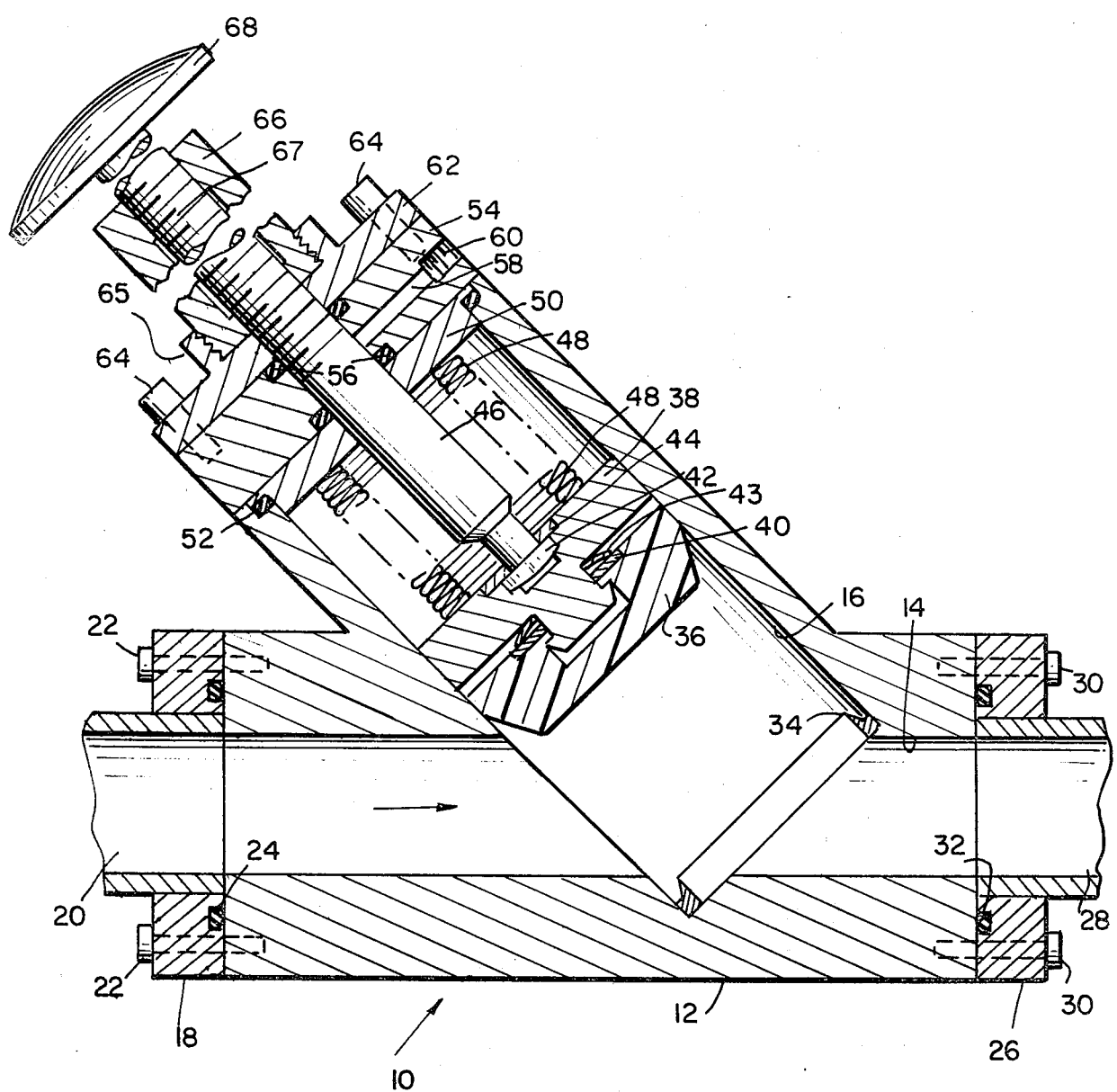
FIG. 1 is a plan cross section of a Y pattern valve.

Referring now to the drawings and in particular FIG. 1 thereof, there is depicted the new and novel Y patterned valve which is constructed in accordance with the principles of the present invention.

A Y valve assembly 10 is shown in FIG. 1 wherein can also be seen a valve body 12 having a through flow chamber 14 and an angled chamber 16. The left most opening of chamber 14 has attached a first flange 18 which is secured to an inlet conduit 20 by vacuum resistant means. Flange 18 is detachably affixed to valve body 12 by a series of flange bolts 22. Flange 18 has a groove on the face abutting valve body 12 for receiving an "O" ring 24 which ensures that flange 18 can be detached from valve body 12 and then reattached to provide a vacuum tight assembly. Similarly, the right most opening of chamber 14 has a second flange 26 secured to an outlet conduit 28 by vacuum resistant means. Second flange 26 is detachably affixed to valve body 12 by a series of flange bolts 30. Flange 26, similarly, has a groove on the face abutting valve body 12 for receiving an "O" ring 32 which enables flange 26 to be detached from valve body 12 and then reattached to provide a vacuum tight assembly. At the intersection of through flow chamber 14 and angled chamber 16 is found a valve seat 34 which is seated on the ledge shown. Valve seat 34 is preferably made of stainless steel and brazed to valve body 12. Valve seat 34 may be affixed by cementing as well as using other methods. Although the valve seat is made of stainless steel and the valve body of aluminum other materials may be used. For instance plastic may be desirable as a valve body in some circumstances.

Within angled chamber 16 is seen a valve seal 36 which is rotatably mounted on a valve plug 38. In this embodiment valve seal 36 is made of teflon but may be any material which is useable. Between valve seal 36 and valve plug 38 is seen a bearing washer 40 and a dished washer 43. Valve seal 36 and valve plug 38 slidably fit within angled chamber 16. Valve plug 38 is rotatably attached to a stem 46 having a stem flanged portion 42 which engages valve plug 38 as shown. A retaining washer 44 is pressed onto valve plug 38 in order to make valve plug 38 captive to stem 46. A bellows 48 has its lower end brazed to the upper surface of valve plug 38 and its upper end brazed to the under surface of a backing plate 50. Backing plate 50 is received by a recess shown on the upper inner portion of angled chamber 16. Found in the recess shown is a bonnet "O" ring 52 for vacuum sealing purposes.

Immediately adjacent to the upper surface of backing plate 50 is an intermediate plate 54 having a series of stem "O" rings 56 affixed therein. Stem "O" rings 56 together with stem 46 form a vacuum tight assembly which enables stem 46 to move rotatably and axially through intermediate plate 54. Intermediate plate 54 has therein a passageway 58 with a threaded portion 60 near the outer surface of intermediate plate 54. The entire assembly of valve body 12, backing plate 50, intermediate plate 54 and a top bonnet plate 62 are held together by a series of bonnet bolts 64. Provided in top bonnet plate 62 is a collar 65 into which is attached an extension collar 66 having a thread which engages a threaded portion 67 located on the upper portion of stem 46. A valve handle 68 is affixed to the uppermost portion of stem 46 for manual control of Y valve assembly 10.

Figure 2:
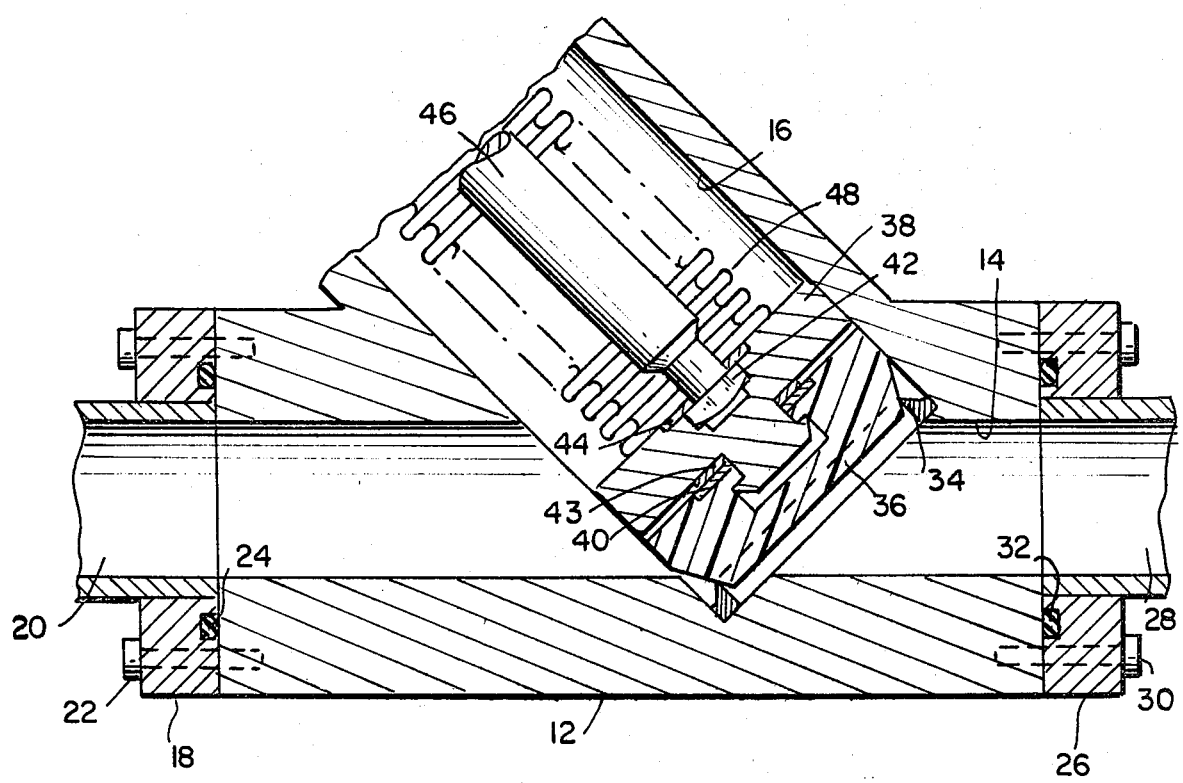
FIG. 2 is a fragmentary cross section of the valve closed.

Whereas FIG. 1 shows Y valve assembly 10 in an open position FIG. 2 shows assembly 10 in a closed position. Many of the items shown herein are described in FIG. 1 and only those items whose functioning has changed will be commented on. FIG. 2 therefore shows stem 46 in an extended position which has caused bellows 48 to open as valve plug 38 advances valve seal 36 against valve seat 34.

Figure 3:
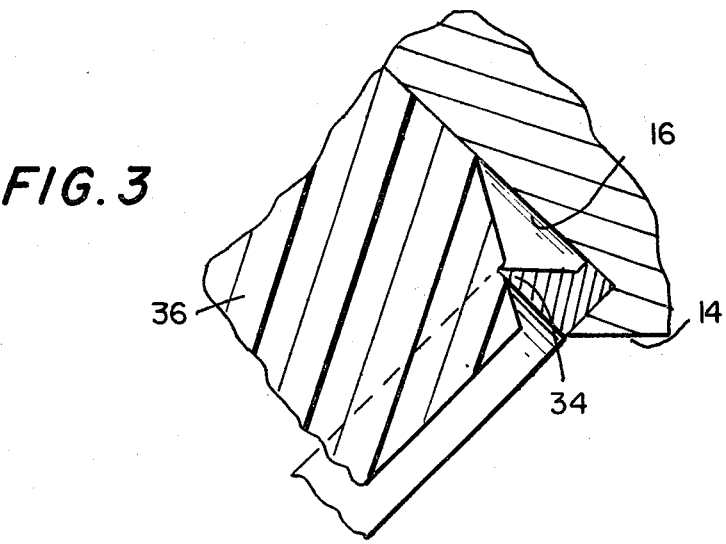
FIG. 3 is a fragmentary cross section detail of the valve seal.

FIG. 3 illustrates a detailed portion of the area between valve seal 36 and valve seat 34. Shown is the deformation of valve seal 36 as it is forced against valve seat 34. A first portion of valve seal 36 enters the inner opening of valve seat 34 whereas a second portion rolls over the uppermost edge of valve seat 34 and flows along the inclined surface.

Operation of the hereinabove described valve is as follows. Valve body 12 is inserted as part of a vacuum system which may contain uranium hexafluoride as a contaminant. The hereindescribed valve can be manually operated or can be fitted for mechanical operation such as in a pneumatic system.

For manual operation the valve handle 68 is rotated so as to cause valve seal 36 to withdraw into the upper portion of angled chamber 16. When valve seal 36 is fully withdrawn a free flow of gas and uranium hexafluoride can occur between inlet conduit 20 and outlet conduit 28. The design of valve seat 34 is intended to minimize the collection of uranium hexafluoride or any other particulate matter on the valve seat 34. This design reduces the amount of turbulence that a gas flow from inlet conduit 20 to outlet conduit 28 experiences. The minimized turbulence due to the placement of valve seat 34 allows the uranium hexafluoride to be carried with the gas flow rather than settle out due to turbulence.

On closing, the sharp edge that valve seat 34 presents to valve seal 36 enables the valve seal 36 to enter the interior of valve seat 34 and at the same time roll over the outside lip of valve seat 34. The preceding action provides a wiping of valve seat 34 by valve seal 36. This wiping removes any uranium hexafluoride which has accumulated. The aforedescribed process can be performed with a minimum of valve stem 46 force while still ensuring a good reliable seal. Comparable prior art valves require 100 PSI to close and 200 PSI to open a pneumatically controlled valve. Whereas a pneumatically controlled valve of the present invention requires 40 PSI to both open and close.

As valve 10 is closed manually valve handle 68 is rotated so as to cause stem 46 to advance valve seal 36 toward valve seat 34. As stem 46 moves into angled chamber 16 it pushes valve plug 38 ahead. Valve plug 38 is attached to stem 46 by stem flanged portion 42. When stem 46 is turned so as to open valve 10 retaining washer 44 makes stem flanged portion 42 captive in the recess seen in valve plug 38 because of retaining washer 44 and valve plug 38 moves away from valve seat 34. Bellows 48 is soldered to valve plug 38 in a gas tight manner as is bellows 48 to backing plate 50. Bellows 50 serves to isolate the stem 46 opening through the backing plate from the vacuum space which exists on the other side of bellows 48. In the event that bellows 48 might leak because of a crack in the bellows material threaded portion 60 is generally connected to a vacuum source so that any gas tending to fill the space between stem 46 and bellows 48 is removed by the vacuum source connected to threaded portion 60. Bonnet "O" ring 52 and stem "O" rings 56 make the bonnet and stem assemblies gas tight.

When stem 46 has been advanced sufficiently to cause valve seal 36 to reach valve seat 34 the following occurs. Valve seal 36 engages valves seat 34 and continued advancement of valve stem 46 causes dished washer 43 to flatten out. The flattening of dished washer 43 prevents stem 46 from jamming valve seal 36 into valve seat 34.

The embodiment of the invention particularly disclosed and described hereinabove is presented merely as an example of the invention. Other embodiments, forms and modifications of the invention coming within the proper scope and spirit of the appended claims, will of course, readily suggest themselves to those skilled in the art.

I claim:

1. A Y pattern valve for controlling a gas flow, comprising:

a valve body having;

a first inner cylindrical chamber having an inlet port and an outlet port for said gas flow;

a second inner cylindrical chamber intersecting said first inner cylindrical chamber at an oblique angle, said second inner cylindrical chamber having a diameter substantially greater than the diameter of said first inner cylindrical chamber in order to provide ledge means for supporting;

valve seat means disposed at said intersection and on said ledge means; and a substantially rectilinear valve stem coaxially disposed within said second inner cylindrical chamber and having affixed thereto inner terminal valve seal means, whereby inwards axial movement of said valve stem causes said valve seal means to engage said valve seat means so that said gas flow is controlled;

said valve seal means comprising a terminal flexible and resilient valve seal member and a valve plug disposed between the terminus of said valve stem and said valve seal member, said valve plug being mounted to the terminus of said valve stem, said valve seal member being mounted to said valve plug;

said valve seat means having a sharp angled outer edge which engages said valve seal member, so that a portion of said valve seal member rolls over the outer edge or lip of said valve seat means and flows along the inclined surface of said valve seat means, to provide a wiping of said valve seat means by said valve seal member, whereby any solid particulate matter which has accumulated is removed, and so that the collection of any solid particulate matter on said valve seat means is minimized;

together with a bearing washer and a dished washer, said bearing washer being coaxially positioned on the surface of said valve seal member between said valve seal and said valve plug, said dished washer being coaxially positioned between said bearing washer and said valve plug, with the concave side of said dished washer facing said bearing washer; so that when said valve seal means engages said valve seat means, said valve seal member enters the interior of said valve seat means, and said dished washer is caused to flatten out, so as to prevent said valve stem from jamming said valve seal member into said valve seat means;

and together with a vacuum sealing closure bellows, said bellows extending coaxially and concentrically about said stem and between said valve plug and a backing plate portion of said valve body, said backing plate portion being disposed at the outer end of said second inner cylindrical chamber and extending transversely to said stem, said vacuum sealing closure bellows providing closure sealing against vacuum loss while permitting axial movement of said stem and appurtenances thereto, with one end of said bellows being attached in a gas-tight manner to said valve plug, and the other end of said bellows being attached in a gas-tight manner to said backing plate portion of said valve body.

2. The Y pattern valve of claim 1, wherein said valve body is aluminum.

3. The Y pattern valve of claim 2, wherein said oblique angle is 45°.

4. The Y pattern valve of claim 3, wherein said valve seat means comprises a valve seat made of stainless steel.

5. The Y pattern valve of claim 4, wherein said valve seat is brazed or cemented to said aluminum body.

6. The Y pattern valve of claim 1, wherein said valve seal means comprises a valve seal made of teflon.

7. The Y pattern valve of claim 1 in which the valve seat means and the valve seal member are circular.

8. The Y pattern valve of claim 1 in which the solid particulate matter comprises uranium hexafluoride.

9. The Y pattern valve of claim 1 in which each end of the bellows is attached to its respective valve element by soldering.

10. The Y pattern valve of claim 1 in which the valve seal member is rotatably mounted to the valve plug.

11. The Y pattern valve of claim 1 in which "O" rings are provided within the valve body and between the elements of the valve, so that said elements may be detached from the valve body and then re-attached, to provide a vacuum tight assembly and for vacuum-tight sealing purposes.

12. The Y pattern valve of claim 1 in which the valve body is provided with a passageway which extends from and substantially transverse to the valve stem, to a vacuum source, so that on leakage of the vacuum space due to material failure or the like, any gas tending to fill the space adjacent the valve stem is removed by said vacuum source.

13. The Y pattern valve of claim 12 in which at least the outer portion of the passageway is threaded.

* * * * *